United States Patent Office 3,672,829
Patented June 27, 1972

3,672,829
SODIUM DITHIONITE SOLUTION STABILIZATION
Mearl A. Kise, Portsmouth, and Leonard C. Ellis, Chesapeak, Va., assignors to Virginia Chemicals, Inc., Portsmouth, Va.
No Drawing. Filed Jan. 16, 1970, Ser. No. 3,526
Int. Cl. C01b *17/66*
U.S. Cl. 23—116                    2 Claims

ABSTRACT OF THE DISCLOSURE

Sodium dithionite in aqueous solution is widely used in bleaching and vat dyeing of textiles. Unfortunately, however, losses occur not only through decomposition during dissolving of the salt in question, but also during storage of the solution.

It has been discovered that the losses by decomposition in a 5% aqueous solution can be significantly reduced by the addition of approximately 0.2% zinc sulfate. Here the rate of anaerobic decomposition in the protected sodium dithionite solution was decreased to 6% of the rate for an unprotected system. As to the stronger grades of the bleaching solution, viz: 15.0% to 17.7% by addition of 1.6% zinc sulfate, the anaerobic decomposition rates were reduced to 25% to 80% of those for unprotected bleaching solutions in storage.

BACKGROUND OF THE INVENTION

Although the product sodium dithionite under normal storage conditions, moisture being excluded and free circulation of air avoided, can be held without appreciable decomposition for several years, upon dissolution of the product in water, decomposition takes place immediately. To avoid this degradation in solution and to prevent acceleration thereof to total decomposition is a problem that has plagued the industry for years. Known decomposition reactions of this valuable commercial bleaching compound are as follows, depending upon the acidic environment wherein the stronger the acidic condition, the faster the rate of reaction.

ANAEROBIC REACTION

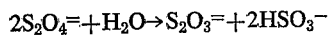

$$2S_2O_4^= + H_2O \rightarrow S_2O_3^= + 2HSO_3^-$$

AEROBIC REACTION

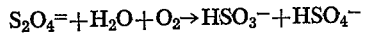

$$S_2O_4^= + H_2O + O_2 \rightarrow HSO_3^- + HSO_4^-$$

By the very nature of the decomposition reaction products, an acid condition is created through either the aerobic or anaerobic reaction aforesaid. Thus, either of the aforementioned reactions is likely to promote and accelerate further degradation of the sodium dithionite solution. Whereas, aerobic decomposition would not appear to be a serious factor in large storage systems—the depth of oxygen penetrating through the surface of the storage system is not great in comparison to the entire depth—auto-oxidation by anaerobic decomposition is inevitable regardless of solution depth or volume, per se.

In the past, the solution has been stabilized to a degree by treatment with caustic or ammonia. Cadmium sulfate as a stabilizer for sodium dithionite prepared in situ from sodium borohydride and sodium metabisulfite is another known form of stabilization. A major disadvantage in the usage of cadmium sulfate would be the formation of yellow cadmium sulfide, a distinct deterrent to brightness in a commercial bleaching operation, per se.

Known references in the literature include the following:

Chemical Week, July 27, 1968, pp. 54–55, M. Wayman, C. B. Anderson, W. J. Lem and W. H. Rapson, TAPPI, 52 (1), 89–92 (1969).

SUMMARY OF THE INVENTION

Under anaerobic conditions sodium dithionite in aqueous solution treated with a small but effective amount of zinc sulfate, conditions of temperature and pH being set, resists decomposition to a marked degree. The degree of resistance to degradation depends of course upon the strength of the solution and additive, the temperature and pH control, as will be seen. The conditions surrounding the intended stabilization reactions will be described hereinafter.

Anaerobic stabilization (I)

There occurs significant stabilization of sodium dithionite under anaerobic preparation and storage—reference Table I. Particularly, it has been found that a 5% aqueous solution of sodium dithionite which is protected with 4% to 10% by weight of zinc sulfate (based on the dithionite), decomposed at only 5% to 12% of the rate for an unprotected bleaching solution of sodium dithionite. The marked improvement in storage life of the protected sodium dithionite, especially in Runs Nos. 717–222, 746–19 and 718–255 will be evident from an examination of Table I. Here the treated sodium dithionite, over a given period of time, achieved a substantially longer life through treatment than did the untreated, all other factors of pH, temperature and the like being similar.

TABLE I
Anaerobic Decomposition of Sodium Dithionite in Presence of Zinc Sulfate

| Run No. | Percent $Na_2S_2O_4$ | Percent $ZnSO_4$ | pH range | Temp., °F. | Time (min.) | Percent decomp. | Decomp. (percent min.) |
|---|---|---|---|---|---|---|---|
| 717–63 | 5.0 | | ¹ 6.1–5.5 | 122 | 90 | 53.7 | 0.60 |
| 717–222 | 5.0 | 0.5 | ¹ 6.0–5.5 | 122 | 90 | 2.5 | 0.03 |
| 178–245 | 5.0 | | 6.5–5.4 | 122 | 90 | 46.8 | 0.52 |
| 718–255 | 5.0 | 0.5 | 6.5–6.0 | 122 | 90 | 5.0 | 0.06 |
| 746–19 | 5.0 | 0.2 | 6.5–5.9 | 122 | 90 | 2.4 | 0.03 |
| 746–29–3 | 5.0 | 0.1 | 6.2–5.6 | 122 | 75 | 6.1 | 0.08 |
| 746–29–1 | 5.0 | 0.1 | 6.1–5.4 | 122 | 60 | 3.2 | 0.05 |

¹ pH adjusted initially to 6.0 to 6.1.

Anaerobic stabilization (II)

Again, with the attempted an aerobic storage of considerably stronger sodium dithionite aqueous solutions, those treated with zinc sulfate achieved vastly more effective storage longevity than those untreated. Here, anaerobic storage tests were developed on 15.0% to 17.7% sodium dithionite solutions at 48° and 90° F. In effect, the rates for the protected samples were from 25% to 80% of those for the unprotected systems. With respect to each run it will be noted that both protected and unprotected systems were tested, the unprotected being represented by the blank calculations shown.

Temperatures below 48° F. enhance the stability of the sodium dithionite solution, and the lower limit would be regulated only by the freezing point of the solution.

TABLE II
Sodium Dithionite Storage Tests—Anaerobic

| Run No. | Percent $Na_2S_2O_4$ | $ZnSO_4$ | Initial pH [1] | Temp., °F. | Time (hours) | Percent decomp. | Decomp. (percent/ hr.) | Decomp. of blank | Blank decomp. (percent/ hr.) |
|---|---|---|---|---|---|---|---|---|---|
| 717-243 | 16.4 | 1.6 | 11.0 | 90 | 74.5 | 13.3 | 0.18 | 18.9 | 0.25 |
| 717-263 | 15.0 | 1.7 | 11.0 | 90 | 74.0 | 21.4 | 0.28 | 25.9 | 0.35 |
| 717-254 | 15.0 | 1.7 | 11.0 | 48 | 480 | 19.0 | 0.04 | 74.4 | 0.16 |
| 717-257 | 15.0 | 1.7 | 11.0 | 48 | 456 | 38.4 | 0.08 | 100.0 | 0.22 |

[1] Each sample contained 7.4 g. of NaOH in excess of that required to reach pH 11.0

Test procedure

The following steps outline the procedure employed in preparing the sodium dithionite solutions for decomposition studies under anaerobic conditions.

(1) A sealed plastic "glove bag" was loaded with necessary supplies and evacuated. The bag was then twice filled with nitrogen and re-evacuated. A final fill was made with high purity nitrogen (<20 p.p.m. $O_2$) to minimize decomposition by oxygen during solution preparation.

(2) The desired amount of deaerated water was measured in a graduated cylinder and transferred to a 2-liter aspirator bottle. The additive to be evaluated was charged, with agitation, to produce a predetermined concentration of the total solution. Agitation was continued until solution of the additive was complete or for a maximum of five minutes (Note 1).

Note 1: For tests in which the initial pH was adjusted to 6.0, 0.3% NaOH was dissolved in the water before adding the additive. After transfer of the dithionite mixture to the test vessel, 2% $H_2SO_4$ was added as needed to adjust the pH to 6.0.

(3) Sodium dithionite was then added with strong agitation to the additive-water solution. The time was measured from first contact of sodium dithionite with the aqueous mixture. Agitation was continued for a total of four minutes at which time sufficient mineral oil was added to cover the surface.

In the treatment of aqueous solutions of sodium dithionite having a strength at from 5.0% to 17.0%, the pH range of control may be varied at from 5.0 to 12.0. Moreover, the additive zinc sulfate in percentage by weight, based upon the dithionite, may range at from 2.0% to 11.3%. And within these conditions of aqueous solution dithionite and pH control, the temperature of the aqueous solution, it has been found, should be maintained at between 30° F. and 122° F., a range which is normally experienced in industrial storage conditions. Whereas improved stabilization may result at higher temperature, the decomposition rate of the aqueous sodium dithionite solution exceeds practical rates, considering the optimum useful life of the sodium dithionite, per se.

We claim:
1. A method to stabilize 15.0%–18.0% aqueous solutions of sodium dithionite against anaerobic decomposition, during preparation and storage thereof, comprising the steps of:
   (A) adding to the solution zinc sulfate at 9.7%–11.3% in percentage by weight, based on the dithionite therein, while
   (B) controlling the pH of the solution at between 10.0 and 12.0, while
   (C) maintaining the temperature of the solution at between 30° and 90° F.
2. The method according to claim 1 in which the aqueous solution of dithionite and the additive zinc sulfate are admixed under the influence of agitation.

References Cited
UNITED STATES PATENTS 1,710,310    4/1929    Helwig _____ 252—188

EARL C. THOMAS, Primary Examiner

U.S. Cl. X.R.

252—188